United States Patent [19]
Capetti

[11] Patent Number: 5,376,867
[45] Date of Patent: Dec. 27, 1994

[54] ELECTRONIC BRAKING DEVICE FOR ASYNCHRONOUS MOTORS

[75] Inventor: Emilio Capetti, Castiglione, Italy

[73] Assignee: Varian Associates, Inc., Palo Alto, Calif.

[21] Appl. No.: 993,936

[22] Filed: Dec. 18, 1992

[30] Foreign Application Priority Data

Dec. 24, 1991 [IT] Italy .................. TO91A001034

[51] Int. Cl.$^5$ ............................... H02P 3/14
[52] U.S. Cl. ......................... 318/376; 318/761
[58] Field of Search .................. 318/362–382, 318/139, 757–764

[56] References Cited

U.S. PATENT DOCUMENTS

| | | | |
|---|---|---|---|
| 3,995,204 | 11/1976 | Konrad et al. | 318/367 |
| 4,039,914 | 8/1977 | Steigerwald et al. | 318/375 |
| 4,143,309 | 3/1979 | Patterson | 318/807 |
| 4,520,296 | 5/1985 | Lepper et al. | 318/254 |
| 4,831,469 | 5/1989 | Hanson et al. | 318/376 X |
| 5,034,669 | 7/1991 | Sako et al. | 318/376 |

*Primary Examiner*—William M. Shoop, Jr.
*Assistant Examiner*—David Martin
*Attorney, Agent, or Firm*—David J. Power; Bella Fishman

[57] ABSTRACT

An electronic braking device is provided for an asynchronous motor equipped with magnetic bearings of a type used in turbomolecular pumps. The device comprises a circuit for recovering the kinetic energy of the rotor as it decelerates as a result of a disruption of electric current from an external power means. The device is adapted to convert the rotational kinetic energy of the rotor to an electric current and in order to maintain the support provided by the magnetic bearings.

6 Claims, 2 Drawing Sheets

ELECTRONIC BRAKING DEVICE FOR ASYNCHRONOUS MOTORS

FIELD OF THE INVENTION

The present invention relates to an electronic braking device for asynchronous motors, and more particularly, to asynchronous motors equipped with magnetic suspensions such as those employed in turbomolecular pumps.

BACKGROUND OF THE INVENTION

An asynchronous motor equipped with magnetic bearings to magnetically suspend the entire rotor assembly, such as those used in turbomolecular pumps, generally provide an electronic circuit for motor braking. The circuit generally applies a braking action to the motor, which in turn supplies back an electric current generated from the EMF of the motor's windings, to a feeding circuit comprised of switching transistors when the driving frequency of the motor decreases.

The electric current generated during the braking phase is usually dissipated in a resistor, which comes on-line as part of the circuit when the brake is actuated.

In such high speed turbomolecular pumps a dedicated circuit generally provided to supply current to the magnetic suspensions and deenergize them when the motor is not in operation. For example, see Hablanian, M. H. "Handbook of Vacuum Technology", Marcel Dekker, Ink, 1990.

In normal operation an AC power source provides energy to the pump motor via a feeding circuit comprised of a main capacitor and an inverter. However in the case of a power source failure, the magnetic suspensions are abruptly deenergized and the rotor assembly of the asynchronous motor returns to its rest position atop the mechanical bearings, normally used only for start-up and final resting support, at the maximum rotational speed which is typically in the order of 36,000 rpm, thus causing a failure of said bearings.

In order to prevent failure of the mechanical bearings, suitable regeneration devices coupled to a switching circuitry can be installed which utilize a battery and an inverter combination, to ensure feeding a current to the magnetic suspensions is maintained until the rotor of the asynchronous motor has stopped.

As an alternative, the bearings supporting the rotor can be made more resistant to mechanical stresses such as those imposed by the sudden and high rotational forces contemplated herein, in order to reduce the consequences of a sudden fall of the magnetic suspensions caused by a mains failure.

These measures, however, have the shortcoming of being complex and costly both in terms of their installment and their proper operation, particularity in view of the cost and limited life of batteries utilized in such devices.

SUMMARY OF THE INVENTION

The object of the present invention is to provide a device capable of eliminating the risk of damage due to a sudden lack of current in an asynchronous motor equipped with magnetic suspensions, such as those used in turbomolecular pumps, which allows for a gradual stopping of the rotor, and which is reliable, easy to manufacture and has a low cost, both in its installment and use.

The above and additional objects are accomplished by use or the present invention, which utilizes an electronic braking device in conjunction with an asynchronous motor equipped with magnetic suspensions, and comprises a circuit for recovering and converting into an electric current the kinetic energy of the rotor of the asynchronous motor when the rotor continues to rotate in the absence of feeding of current from the external power source (mains). A frequency control unit monitors the drive frequency of a current feeding unit, comprised of a three-phase transistor bridge, the bases or gates of which are coupled to the frequency control unit. The three-phase bridge is connected in parallel with a storage capacitor which during normal operation is charged while the feeding circuit directs current from the mains to the pump motor. Upon failure of the mains, the EMF generated from the motor windings is used to produce a current, which is rectified by the circuitry of the feeding unit and directed to charge the storage capacitor. The capacitor, being charged by the decelerating motor, simultaneously discharges, applying its voltage to a dedicated converting unit which transforms a variable voltage from the capacitor to a regulated voltage, wherein the output of said converting unit feeds the rotor's magnetic suspensions during the decelerating rotation of the rotor.

Additional characteristics and advantages of the invention will be better understood from the description of a preferred but not exclusive embodiment of the device illustrated only as a nonlimiting example in the attached drawings, in which:

DESCRIPTION OF THE PREFERRED EMBODIMENTS

Figure 1:
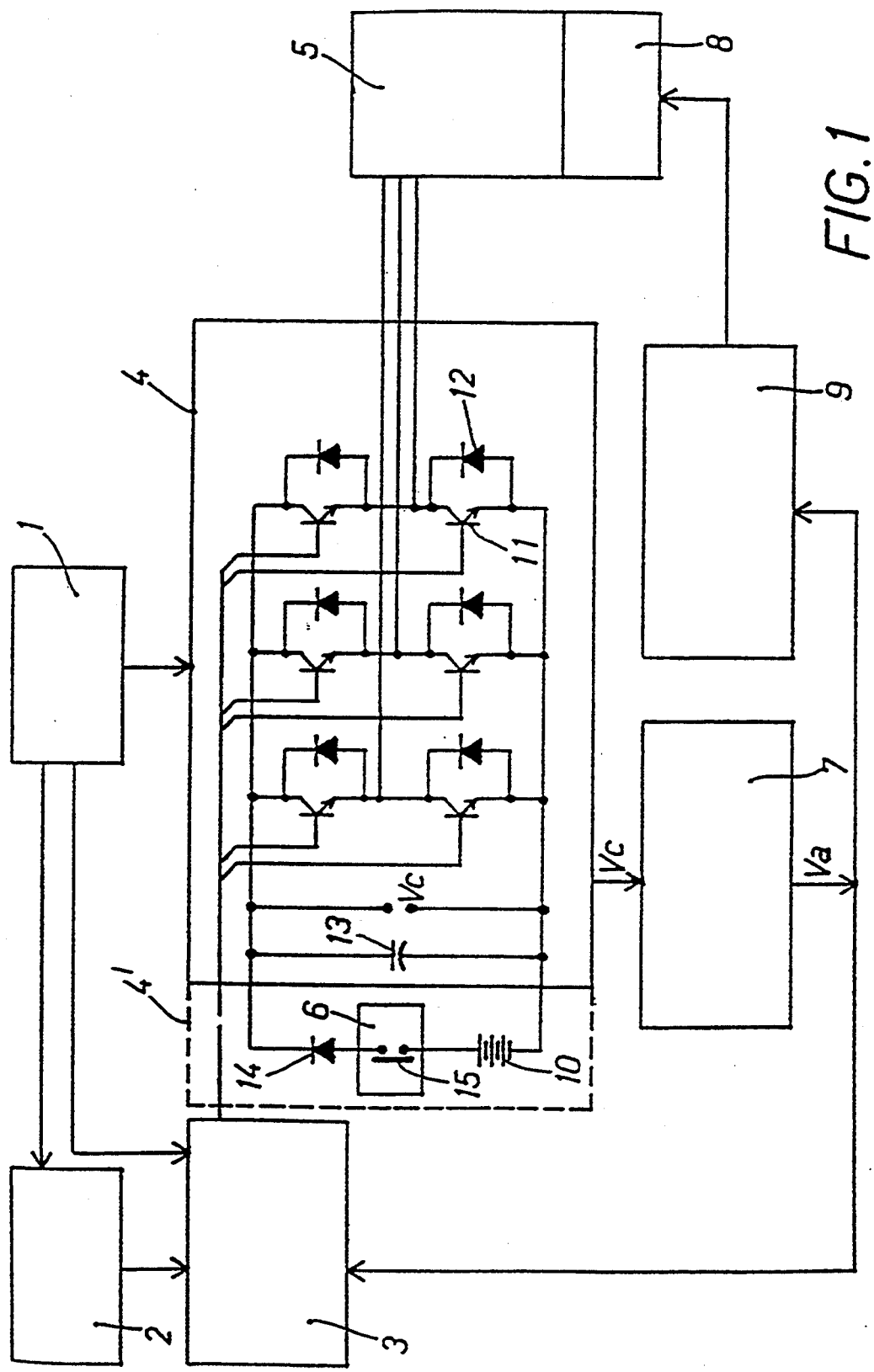
FIG. 1 is a block diagram of the device according to the invention.
Figure 2:
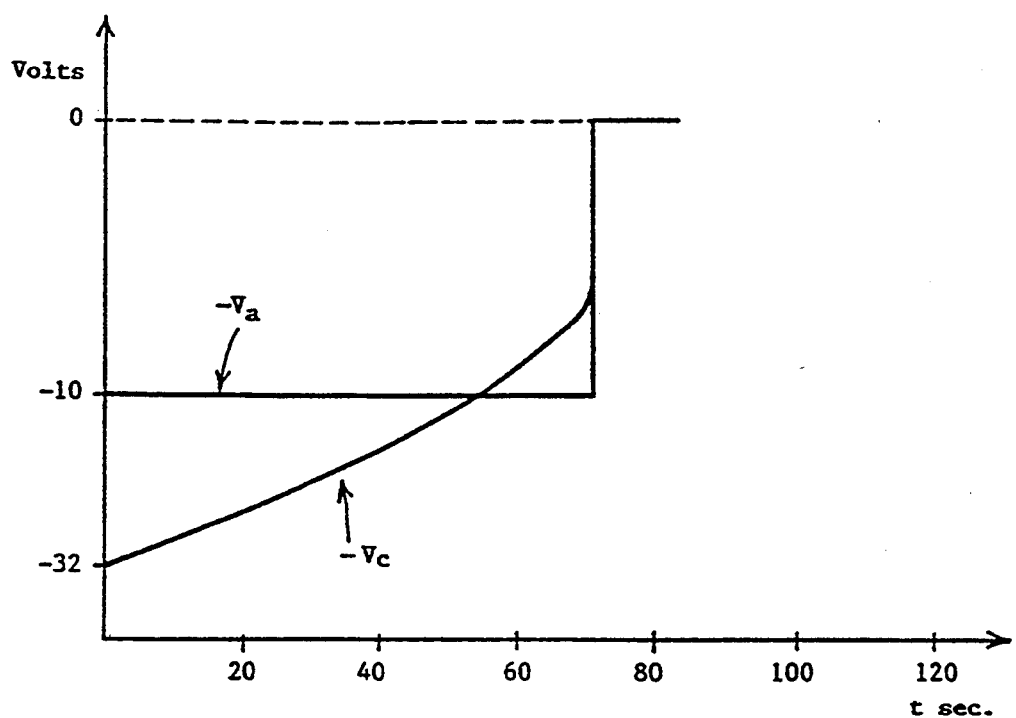
FIG. 2 is a graph showing the voltages $V_c$ and $V_a$ as a function of time in the final decelerating phase of the rotor rotation.
Figure 3:
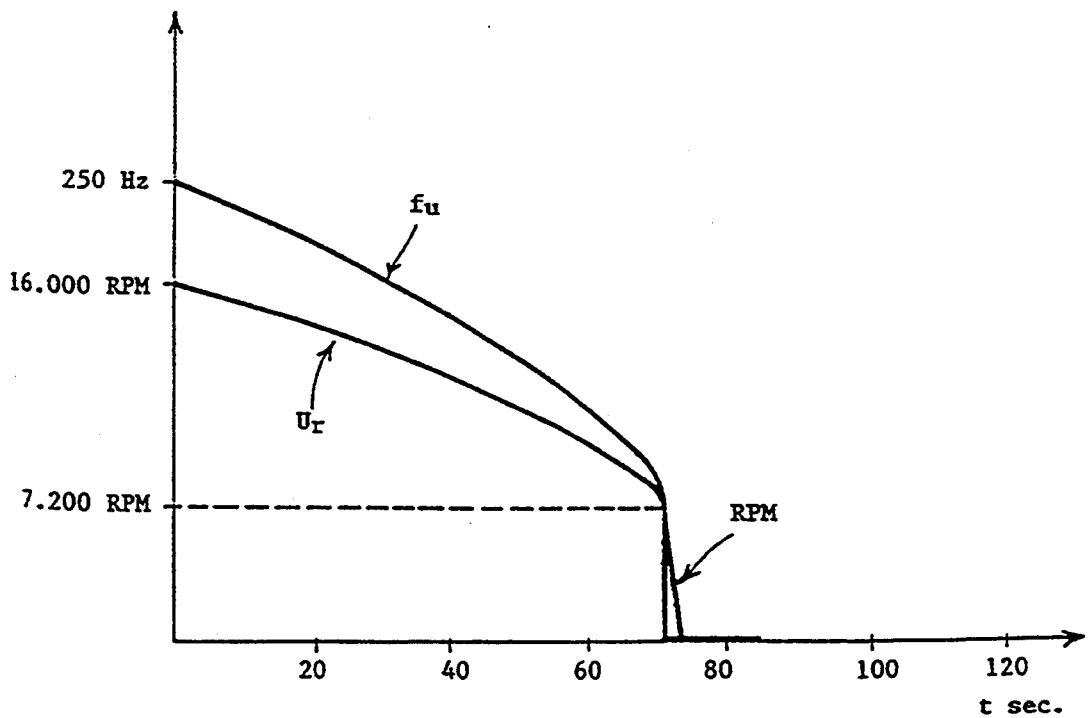
FIG. 3 is a graph showing the driving frequency $f_u$ and the speed $U_r$ as a function of time of the rotor rotation in the decelerating phase corresponding to the graph of FIG. 2.

With reference to FIG. 1, the braking device of the invention comprises a first mains current feeding unit 1 and a second detecting unit 2 for detecting a lack of current from the mains, and adapted to signal a third unit 3 for monitoring and controlling the driving frequency, from a working phase under normal feeding of current from the mains to a decelerating and braking phase caused by a lack of such feeding.

During normal pump operation, unit 3 controls the frequency at which inverter circuit 4 is driven. This circuit comprises transistors 11, each in parallel with an associated diode and capable of supplying asynchronous motor 5 with a three-phase alternating current at a frequency imposed by the control unit 3. While FIG. 1 depicts bipolar transistors, one skilled in the art will recognize that field effect transistors, such as MOSFETs, may be used in place of bipolor transistors, and even preferred, depending on the operational parameters of the circuit.

The inverter circuit 4 further comprises a capacitor 13 in parallel with transistor 11 for storing a charge during the normal working phase when the motor is fed current by the mains 1. The voltage $V_c$ across such capacitor 13 is applied to regulating unit 7 for converting the variable DC voltage $V_c$, into a regulated DC voltage $V_a$ that is applied to both unit 3 and unit 9 for controlling magnetic suspensions 8 of asynchronous motor 5 as will be better illustrated later.

When the applied voltage from the mains fails, detecting unit 2 signals the frequency control unit 3, which immediately starts decreasing the driving frequency applied to asynchronous motor 5 via the transistors of inverter circuit 4. The driving frequency is adjusted as a function of the frequency of the residual rotation of the motor so that as the rotor spools down its rotational frequency remains higher than the adjusted driving frequency. This way motor 5 is effectively braked, and thus a three-phase alternating current is returned to circuit 4.

The returning current generated by the residual rotation of motor 5 in its decelerating phase is rectified by diode 12 of circuit 4, and charge capacitor 13 which is simultaneously discharged by a current drawn by regulating unit 7. In the circuitry for operating the illustrated embodiment regulating unit 7 provides current to both unit 9, the control circuitry for magnetic suspensions 8 of asynchronous motor 5, and the frequency control unit 3. Thus, the asynchronous motor is forced to slow down, wherein the current it supplies back, as a result of the residual rotation of the rotor, is used to keep magnetic suspensions 8 operational until capacitor 13 has fully discharged and the voltage supplied by motor 5 is no longer sufficient to sustain the magnetic suspensions 8.

For more gradual stopping of the motor-magnetic suspensions system in the final phase of its deceleration, it has been found to be particularly effective to utilize an auxiliary system stage 4', comprising battery 10 in series with diode 14, which is applied to circuit 4 when the voltage on capacitor 13 is lower than that of the battery.

The auxiliary system of stage 4' further comprises unit 6 for limiting the discharge current applied to circuit 4, wherein unit 6 disconnects the battery through either an electromechanical or static contact 15 to protect battery 10 from an excessive discharge.

In an embodiment of the invention it was found that with a capacitor of 25 mF the rotor speed $U_r$ changes from 36,000 rpm to 7,200 rpm when the capacitor voltage $V_c$ decreases from $V_c=70$ v to $V_c=10$ v. When auxiliary stage 4' is applied in the final stages of deceleration, the final rotor speed can be reduced to 1,500 rpm before limiting unit 6 protecting the battery has to intervene by opening the circuit via contact 15 in order to prevent a damaging discharge from the battery.

Accordingly, what is claimed is:

1. A device for braking an asynchronous motor having a rotor with magnetic suspensions which is supplied, in operation, by external power from an external power means, said device comprising;

a feeding circuit means for directing current to said asynchronous motor, said feeding circuit operatively connected to said external power means;

a circuit for recovering and converting an a rotational kinetic energy of said rotor to an electric current during deceleration rotation of said rotor, said recover circuit coupled to said feeding circuit;

a detecting means for indicating loss of said external power;

a means for controlling a driving frequency of said feeding circuit, said frequency control means operatively connected to said feeding circuit means and said detection means; and a dedicated converting means for feeding current from the decelerating rotor to said magnetic suspensions and said controlling means, said control means responsive to the rotational frequency of said rotor by adjusting the driving frequency of said feeding circuit to a frequency less than said rotational frequency.

2. The device of claim 1, wherein said feed circuit means comprises a three-phase bridge of transistors said transistors each connected in parallel with a diode;

3. The device of claim 2, wherein said transistors of the three phase bride are MOSFET transistors.

4. The device of claim 2, wherein said transistors of the phase bridge are bipolor transistors.

5. The device of claim 2, wherein said feeding circuit means further comprises a storage capacitor connected in parallel with said three-phase bridge.

6. The device of claim 5, wherein the capacitor supplies current to the dedicated converting means upon failure of said external power means.

* * * * *